(12) United States Patent
Hayama et al.

(10) Patent No.: US 12,264,748 B2
(45) Date of Patent: Apr. 1, 2025

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/201,095

(22) Filed: May 23, 2023

(65) Prior Publication Data

US 2023/0296187 A1 Sep. 21, 2023

Related U.S. Application Data

(62) Division of application No. 17/599,474, filed as application No. PCT/JP2020/015177 on Apr. 2, 2020, now Pat. No. 12,072,035.

(30) Foreign Application Priority Data

Apr. 3, 2019 (JP) ................................. 2019-071632

(51) Int. Cl.
 *F16K 31/06* (2006.01)
 *F16K 27/02* (2006.01)
 *F16K 17/04* (2006.01)

(52) U.S. Cl.
 CPC ........ *F16K 27/029* (2013.01); *F16K 31/0655* (2013.01); *F16K 31/0658* (2013.01); *F16K 31/0693* (2013.01); *F16K 17/04* (2013.01)

(58) Field of Classification Search
 None
 See application file for complete search history.

(56) References Cited

U.S. PATENT DOCUMENTS 3,765,644 A 10/1973 Zeuner ................ F15K 31/0655
4,291,860 A 9/1981 Bauer ................. F16K 31/0655
(Continued)

FOREIGN PATENT DOCUMENTS

CN 2869383 2/2007 ............. F04B 49/22
CN 102384056 3/2012 ............. F04B 27/14
(Continued)

OTHER PUBLICATIONS

Chinese Official Action issued in related application serial No. 202080026542.X, dated Jun. 12, 2023, 11 pages with translation.
(Continued)

Primary Examiner — Matthew W Jellett
(74) Attorney, Agent, or Firm — HAYES SOLOWAY P.C.

(57) ABSTRACT

A capacity control valve capable of being downsized with the small number of parts is provided. A capacity control valve includes a valve housing provided with a suction port through which a suction fluid of suction pressure Ps passes, and a control port through which a control fluid of control pressure Pc passes, a valve element configured to be driven by a solenoid, a spring that biases the valve element in a direction opposite to a driving direction of the solenoid, and a CS valve formed by a CS valve seat 10a and the valve element and configured to open and close a communication between the control port and the suction port in accordance with a movement of the valve element. The control pressure Pc is controlled by opening and closing the CS valve.

12 Claims, 8 Drawing Sheets

(56) References Cited

U.S. PATENT DOCUMENTS

| | | | | |
|---|---|---|---|---|
| 5,022,629 | A | 6/1991 | Tibbals | B05B 1/3053 |
| 5,076,538 | A | 12/1991 | Mohr | B60T 15/028 |
| 5,199,855 | A | 4/1993 | Nakajima | F04C 28/14 |
| 5,277,552 | A | 1/1994 | Higuchi | |
| 5,401,087 | A | 3/1995 | Goossens | F16J 15/56 |
| 5,503,184 | A | 4/1996 | Reinartz | B60T 8/367 |
| 6,142,445 | A | 11/2000 | Kawaguchi | F16K 31/0613 |
| 6,217,292 | B1 | 4/2001 | Ota | F04B 27/1804 |
| 6,234,763 | B1 | 5/2001 | Ota et al. | 417/222.2 |
| 6,244,159 | B1 | 6/2001 | Kimura et al. | F01B 3/02 |
| 6,250,600 | B1 | 6/2001 | Kumagai | G05D 16/0619 |
| 6,350,106 | B1 | 2/2002 | Shimizu | F04B 27/1804 |
| 6,398,516 | B1 | 6/2002 | Kawaguchi et al. | 417/222.2 |
| 6,443,708 | B1 | 9/2002 | Hirota | F04B 49/00 |
| 6,481,976 | B2 | 11/2002 | Kimura | F04B 25/26 |
| 6,585,494 | B1 | 7/2003 | Suzuki | F25B 9/008 |
| 6,644,621 | B2 | 11/2003 | Ji | B60T 13/686 |
| 6,772,990 | B2 | 8/2004 | Sasaki et al. | F04B 49/00 |
| 6,893,215 | B2 | 5/2005 | Kuwabara et al. | F01D 25/26 |
| 6,976,665 | B2 | 12/2005 | Seitz | B60T 8/363 |
| 7,014,427 | B1 | 3/2006 | Hirota | 417/218 |
| 7,987,871 | B2 * | 8/2011 | Cho | F16K 31/0627 251/282 |
| 8,418,723 | B2 | 4/2013 | Tsuchiya | F16K 31/0655 |
| 8,550,427 | B2 | 10/2013 | Yoshida | B60T 8/363 |
| 9,334,978 | B2 | 5/2016 | Lappan | F04C 2/3442 |
| 9,581,149 | B2 | 2/2017 | Ota et al. | F04B 27/1804 |
| 9,651,037 | B2 | 5/2017 | Sakakibara | |
| 10,077,849 | B2 | 9/2018 | Iwa et al. | F16K 31/06 |
| 10,174,860 | B2 * | 1/2019 | Noda | F16K 31/0655 |
| 10,316,975 | B2 | 6/2019 | Fangauer | F16K 1/38 |
| 10,781,804 | B2 | 9/2020 | Higashidozono | F04B 27/18 |
| 10,823,162 | B2 | 11/2020 | Kume et al. | F04B 27/18 |
| 10,837,431 | B2 | 11/2020 | Tonegawa et al. | F04B 27/18 |
| 10,907,624 | B2 | 2/2021 | Kume et al. | F04B 27/18 |
| 11,215,293 | B2 | 1/2022 | Fukuda | F04B 53/10 |
| 11,231,111 | B2 | 1/2022 | Hurst | |
| 11,320,061 | B2 | 5/2022 | Nishimura et al. | F16K 31/06 |
| 11,480,166 | B2 | 10/2022 | Hayama | F04B 27/10 |
| 2002/0031432 | A1 | 3/2002 | Ota et al. | F04B 1/26 |
| 2002/0098091 | A1 | 7/2002 | Umemura | F04B 27/1804 |
| 2003/0019226 | A1 | 1/2003 | Hirota | F04B 27/1804 |
| 2004/0060604 | A1 | 4/2004 | Uemura | G05D 16/2024 |
| 2004/0091368 | A1 | 5/2004 | Kainuma | F04B 27/1804 |
| 2004/0118140 | A1 | 6/2004 | Umemura et al. | F25B 41/04 |
| 2005/0287014 | A1 | 12/2005 | Umemura et al. | F04B 1/26 |
| 2006/0237552 | A1 | 10/2006 | Umemura | F16K 31/0655 |
| 2007/0069576 | A1 | 3/2007 | Suzuki | |
| 2007/0164244 | A1 | 7/2007 | Kratzer | F16K 31/0658 |
| 2007/0267078 | A1 | 11/2007 | Collet et al. | F15B 13/04 |
| 2008/0175727 | A1 | 7/2008 | Umemura | F04B 27/1804 |
| 2010/0264342 | A1 | 10/2010 | Heyer | F16K 31/0655 |
| 2011/0042605 | A1 | 2/2011 | Gyger | |
| 2011/0091334 | A1 | 4/2011 | Taguchi | F04B 27/1804 |
| 2012/0056113 | A1 | 3/2012 | Tano et al. | F16K 31/12 |
| 2013/0291963 | A1 | 11/2013 | Futakuchi et al. | B60H 1/00 |
| 2014/0369862 | A1 | 12/2014 | Ota et al. | F04B 27/1804 |
| 2015/0044065 | A1 | 2/2015 | Ota et al. | F04B 27/18 |
| 2015/0211502 | A1 | 7/2015 | Ota et al. | F04B 7/0076 |
| 2015/0345655 | A1 | 12/2015 | Higashidozono | F04B 27/1804 |
| 2016/0053755 | A1 | 2/2016 | Taguchi | F04B 27/1804 |
| 2016/0186733 | A1 | 6/2016 | Sugamura et al. | F04B 27/1804 |
| 2017/0175723 | A1 | 6/2017 | Kume | F04B 27/1804 |
| 2017/0314700 | A1 | 11/2017 | Iwanaga et al. | F16K 31/0675 |
| 2018/0056954 | A1 | 3/2018 | Kollmann | F16K 31/0658 |
| 2019/0331249 | A1 | 10/2019 | Borja | F16K 1/44 |

FOREIGN PATENT DOCUMENTS

| | | | |
|---|---|---|---|
| CN | 103671033 | 3/2014 | F04B 39/08 |
| CN | 105736308 | 7/2016 | F04B 39/00 |
| CN | 109416133 | 3/2019 | F16K 31/06 |
| EP | 0255764 | 7/1987 | F04B 1/28 |
| EP | 0945617 | 9/1999 | F04B 27/18 |
| EP | 0945618 | 9/1999 | |
| EP | 0980976 | 2/2000 | F04B 27/18 |
| EP | 1091125 | 4/2001 | F04B 27/18 |
| EP | 1098091 | 5/2001 | F04B 27/18 |
| EP | 1052124 | 11/2002 | B60H 1/32 |
| EP | 1279831 | 1/2003 | F04B 27/18 |
| EP | 1375918 | 1/2004 | F04B 27/18 |
| EP | 1512871 | 3/2005 | F04B 27/18 |
| EP | 2952741 | 12/2015 | F16K 31/06 |
| EP | 2963293 | 1/2016 | F04B 27/10 |
| GB | 787961 | 12/1957 | F04B 43/067 |
| JP | S62170466 | 10/1987 | F16K 31/06 |
| JP | 7-27049 | 1/1995 | F04B 24/10 |
| JP | 2000-87849 | 3/2000 | F04B 27/14 |
| JP | 2000-161234 | 6/2000 | F04B 49/00 |
| JP | 3242496 | 10/2001 | F04B 27/14 |
| JP | 2002-70732 | 3/2002 | F04B 27/14 |
| JP | 2002-201913 | 7/2002 | F01D 11/00 |
| JP | 2003-322086 | 11/2003 | F04B 49/00 |
| JP | 2004162856 | 6/2004 | F16K 31/06 |
| JP | 3581598 | 7/2004 | F04B 29/10 |
| JP | 2006-17087 | 1/2006 | F04B 27/14 |
| JP | 2006-52648 | 2/2006 | F04B 27/14 |
| JP | 3783434 | 3/2006 | F04B 27/14 |
| JP | 2007177627 | 7/2007 | F04B 27/14 |
| JP | 4100161 | 6/2008 | F16H 61/00 |
| JP | 2011017381 | 1/2011 | F16H 61/00 |
| JP | 2011-94554 | 5/2011 | F04B 27/14 |
| JP | 2014-80927 | 5/2014 | F04B 27/14 |
| JP | 2014-126025 | 7/2014 | F04B 27/14 |
| JP | 2015-1168 | 1/2015 | F04B 27/14 |
| JP | 2015-34510 | 2/2015 | F04B 27/14 |
| JP | 201620682 | 2/2016 | F04B 27/14 |
| JP | 5983539 | 8/2016 | F04B 27/18 |
| JP | 2017-31834 | 2/2017 | F04B 27/18 |
| JP | 2018-3884 | 1/2018 | F16K 31/06 |
| JP | 2018179087 | 11/2018 | F16K 31/06 |
| JP | 2019143781 | 8/2019 | F16K 11/07 |
| WO | WO2005095796 | 10/2005 | F04B 27/14 |
| WO | WO2012077439 | 6/2012 | F04B 27/14 |
| WO | WO2015093502 | 6/2015 | F04B 49/80 |
| WO | WO2017057160 | 4/2017 | F04B 27/18 |
| WO | WO2018061380 | 4/2018 | F04B 27/18 |
| WO | WO2019102909 | 5/2019 | F16K 31/06 |
| WO | WO2013005538 | 1/2023 | F16K 17/06 |

OTHER PUBLICATIONS

Chinese Official Action issued in related application serial No. 202080026419.8, dated May 24, 2023, 10 pages with translation.

Chinese Official Action issued in related application serial No. 202080026542.X, dated Mar. 16, 2023, 11 pages with translation.

Chinese Official Action issued in related application serial No. 202080026542.X, dated Aug. 29, 2023, 13 pages with translation.

Chinese Official Action issued in related application serial No. 202080026977.4, dated Aug. 25, 2023, 17 pages with translation.

European Search Report issued in related application serial No. 23174587.8, dated Sep. 12, 2023, 14 pages.

European Search Report issued in related application serial No. 23180732.2, dated Oct. 18, 2023, 7 pages.

Official Action issued in related U.S. Appl. No. 17/599,474, dated Jun. 27, 2023, 12 pages.

Official Action issued in related U.S. Appl. No. 17/599,474, dated Sep. 29, 2023, 12 pages.

Official Action issued in related U.S. Appl. No. 17/603,284, dated Aug. 21, 2023, 13 pages.

Official Action issued in related U.S. Appl. No. 17/603,291, dated Aug. 22, 2023, 11 pages.

Official Action issued in related U.S. Appl. No. 17/919,731, dated Nov. 9, 2023, 7 pages.

Official Action issued in related U.S. Appl. No. 17/603,291, dated Nov. 6, 2023, 11 pages.

Notice of Allowance issued in related U.S. Appl. No. 17/599,467, dated Aug. 8, 2023, 19 pages.

European Official Action issued in related Application No. 20795975.0, dated May 3, 2024, 6 pages.

(56) References Cited

OTHER PUBLICATIONS

Korean Official Action issued in related Application No. 10-2022-7037944, dated Apr. 1, 2024 with translation, 9 pages.
Official Action issued in related U.S. Appl. No. 17/919,731, dated May 3, 2024, 8 pages.
Notice of allowance issued in related U.S. Appl. No. 17/603,291, dated Apr. 17, 2024, 7 pages.
Notice of allowance issued in related U.S. Appl. No. 17/603,284, dated Nov. 2, 2023, 9 pages.
International Preliminary Report on Patentability issued in PCT International Patent Application Serial No. PCT/JP2020/015177, dated Oct. 14, 2021 with translation (6 pgs).
International Search Report and Written Opinion issued in PCT International Patent Application Serial No. PCT/JP2020/015177, dated Jun. 23, 2020 with translation (14 pgs).
International Search Report and Written Opinion issued in PCT International Patent Application Serial No. PCT/JP2020/015179, dated Jun. 9, 2020 with translation (11 pgs).
International Preliminary Report on Patentability issued in PCT International Patent Application Serial No. PCT/JP2020/015179, dated Oct. 26, 2021 with translation (5 pgs).
International Search Report and Written Opinion issued in PCT International Patent Application Serial No. PCT/JP2020/017169, dated Jun. 16, 2020 with translation (12 pgs).
International Preliminary Report on Patentability issued in PCT International Patent Application Serial No. PCT/JP2020/017169, dated Nov. 4, 2021 with translation (5 pgs).
International Search Report and Written Opinion issued in PCT International Patent Application Serial No. PCT/JP2020/017168, dated Jun. 16, 2020 with translation (14 pgs).
International Preliminary Report on Patentability issued in PCT International Patent Application Serial No. PCT/JP2020/017168, dated Nov. 4, 2021 with translation (6 pgs).
International Search Report and Written Opinion issued in PCT International Patent Application Serial No. PCT/JP2020/015176, dated Jun. 23, 2020 with translation (12 pgs).
International Preliminary Report on Patentability issued in PCT International Patent Application Serial No. PCT/JP2020/015176, dated Oct. 14, 2021 with translation (5 pgs).
International Search Report and Written Opinion issued in PCT International Patent Application Serial No. PCT/JP2020/015180, dated Jun. 9, 2020 with translation (11 pgs).
International Preliminary Report on Patentability issued in PCT International Patent Application Serial No. PCT/JP2020/015180, dated Oct. 14, 2021 with translation (5 pgs).
Chinese Official Action issued in related Chinese Application Serial No. 202080026556.1, dated Oct. 9, 2022, 9 pages.
Chinese Official Action issued in related Chinese Application Serial No. 202080026542.X, dated Oct. 8, 2022, 9 pages.
Chinese Official Action issued in related Chinese Application Serial No. 202080026419.8, dated Sep. 29, 2022, 10 pages.
Chinese Official Action issued in related Chinese Application Serial No. 202080026977.4 dated Oct. 21, 2022, 11 pages.
Chinese Official Action issued in related Chinese Application Serial No. 202080028782.3 dated Dec. 15, 2022, 10 pages.
Chinese Official Action issued in related Chinese Application Serial No. 202080028860.X dated Nov. 22, 2022, 12 pages.
Chinese Official Action issued in related application serial No. 202080026977.4, dated Apr. 20, 2023, 12 pages with translation.
European Search Report issued in related European Patent Application Serial No. 20783904.4, dated Oct. 19, 2022, 7 pages.
European Search Report issued in related European Patent Application Serial No. 20795975.0, dated Oct. 19, 2022, 7 pages.
European Search Report issued in related European Patent Application Serial No. 20795023, dated Dec. 5, 2022, 9 pages.
European Search Report issued in related European Patent Application Serial No. 20782343, dated Oct. 18, 2022, 8 pages.
European Search Report issued in related European Patent Application Serial No. 20782596, dated Nov. 2, 2022, 9 pages.
European Search Report issued in related European Patent Application Serial No. 20785209, dated Oct. 27, 2022, 8 pages.
Korean Official Action issued in related application serial No. 10-2021-7036305, dated Mar. 15, 2023, 8 pages with translation.
Official Action issued in related U.S. Appl. No. 17/599,474, dated Mar. 2, 2023, 11 pages.
Official Action issued in related U.S. Appl. No. 17/599,467, dated Jan. 24, 2023, 11 pages.
Official Action issued in related U.S. Appl. No. 17/599,520, dated Jan. 30, 2023, 8 pages.
Official Action issued in related U.S. Appl. No. 17/603,284, dated May 3, 2023, 10 pages.
Official Action issued in related U.S. Appl. No. 17/599,467, dated May 10, 2023, 12 pages.
Official Action issued in related U.S. Appl. No. 17/603,291, dated May 8, 2023, 9 pages.
Chinese Official Action issued in related Application No. 202080026977.4, dated Nov. 16, 2023 with translation, 18 pages.
Chinese Official Action issued in related Application No. 2020080026419.8, dated Dec. 1, 2023 with translation, 17 pages.
European Official Action issued in related Application No. 20795023.9, dated Jan. 30, 2024, 6 pages.
European Official Action issued in related Application No. 21792462.0, dated Feb. 15, 2024, 7 pages.
European Official Action issued in related Application No. 20785209.6, dated Mar. 15, 2024, 6 pages.
European Official Action issued in related Application No. 20868996.8, dated Oct. 2, 2023, 8 pages.
Japanese Official Action issued in related Application No. 2021-516128, dated Dec. 5, 2023 with translation, 8 pages.
Korean Official Action issued in related Application No. 10-2021-7034329, dated Jan. 2, 2024 with translation, 12 pages.
Official Action issued in related U.S. Appl. No. 17/603,291, dated Feb. 20, 2024, 10 pages.
Official Action issued in related U.S. Appl. No. 17/255,085, dated Mar. 28, 2024, 8 pages.
Official Action issued in related U.S. Appl. No. 17/600,529, dated Jan. 24, 2024, 15 pages.
Official Action issued in related U.S. Appl. No. 17/599,474, dated Dec. 14, 2023, 12 pages.
Advisory Action issued in related U.S. Appl. No. 17/599,474, dated Mar. 21, 2024, 6 pages.
European Official Action issued in related Application No. 20782596.9, dated Sep. 26, 2024, 7 pages.
Notice of Allowance issued in related U.S. Appl. No. 17/600,529, dated Sep. 3, 2024, 9 pages.
Notice of Allowance issued in related U.S. Appl. No. 17/599,474, dated May 1, 2024, 9 pages.

* cited by examiner

CAPACITY CONTROL VALVE

CROSS REFERENCE TO RELATED APPLICATION

The subject application is a divisional application of U.S. patent application Ser. No. 17/599,474, filed Sep. 28, 2021, which is a 371 of PCT International Patent Application Serial No. PCT/JP2020/015177, filed Apr. 2, 2020, which claims benefit of Japanese Patent Application Serial No. 2019-071632, filed Apr. 3, 2019, the contents of which are disclosed herewith.

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and a DC valve provided between a discharge port through which a discharge fluid of the discharge pressure Pd passes and a control port through which a control fluid of the control pressure Pc passes is opened and closed to adjust the control pressure Pc of the control chamber of the variable displacement compressor.

At the time of normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a desired cooling ability.

In the capacity control valve of Patent Citation 1, by opening and closing the DC valve to control the fluid of the discharge pressure Pd supplied to the control chamber of the variable displacement compressor and bringing a pressure difference between the discharge pressure Pd of the discharge chamber and the control pressure Pc of the control chamber respectively applied in the stroke direction of the pistons close to a target value, the discharge amount of the fluid discharged from the discharge chamber is changed. A valve opening degree of the DC valve is changed in accordance with the electromagnetic force by an electric current applied to the solenoid, and in response to this, the target value of the pressure difference is changed, so that the discharge amount of the fluid discharged from the discharge chamber is changed.

In Patent Citation 1, by Pd-Pc control that makes adjustment in such a manner that the fluid of the discharge pressure Pd is supplied to the control chamber to increase the control pressure Pc, it is possible to promptly perform pressure adjustment. However, in order to perform more precise pressure adjustment, a pressure sensitive body having a bellows is provided in a pressure sensitive chamber of the capacity control valve, and by extending and contracting the pressure sensitive body in the moving direction of the valve element in accordance with the suction pressure Ps, bias force is applied in the valve opening direction of the valve element, and the valve opening degree of the DC valve is adjusted. In such a way, by adjusting the valve opening degree of the DC valve by the pressure sensitive body that senses the suction pressure Ps with respect to fixed electromagnetic force in accordance with the electric current applied to the solenoid, the control pressure Pc is finely adjusted additionally taking the suction pressure Ps in consideration, and precision for controlling the discharge amount of the fluid discharged from the discharge chamber is enhanced.

CITATION LIST

Patent Literature

Patent Citation 1: JP 2017-31834 A (PAGE 6, FIG. 2)

SUMMARY OF INVENTION

Technical Problem

In the capacity control valve of Patent Citation 1, the precision for controlling the discharge amount of the fluid discharged from the discharge chamber is enhanced. However, for that, the pressure sensitive body for sensing the suction pressure Ps has to be provided. Thus, there are problems that the number of parts forming the capacity control valve is increased and the capacity control valve is enlarged.

The present invention is achieved focusing on such problems, and an object thereof is to provide a capacity control valve capable of being downsized with the small number of parts.

Solution to Problem

In order to solve the foregoing problem, a capacity control valve according to the present invention is a capacity control valve including: a valve housing provided with a suction port through which a suction fluid of suction pressure passes, and a control port through which a control fluid of control pressure passes; a valve element configured to be driven by a solenoid; a spring that biases the valve element in a direction opposite to a driving direction of the solenoid; and a CS valve formed by a CS valve seat and the valve element and configured to open and close a communication between the control port and the suction port in accordance with a movement of the valve element, wherein the control pressure is controlled by opening and closing the CS valve.

According to the aforesaid feature of the present invention, Pc-Ps control that opens and closes the CS valve to supply the control fluid of the control pressure to the suction chamber and lower the control pressure of the control chamber is performed. In other words, a discharge fluid of discharge pressure which is high pressure is not controlled. Thus, by a valve opening degree of the CS valve adjusted by balance between electromagnetic force of the solenoid and bias force of the spring, it is possible to finely change the control pressure Pc. In addition, there is no need for adjusting the valve opening degree of the CS valve by a pressure sensitive body. Thus, it is possible to provide the capacity control valve which is downsized with the small number of parts.

It may be preferable that the CS valve seat and a guide hole into which the valve element is inserted is formed in the valve housing. According to this preferable configuration, by guiding the valve element into the guide hole of the valve housing, it is possible to enhance stroke precision of the valve element.

It may be preferable that the CS valve seat and the guide hole are provided in one member element which partially or integrally forms the valve housing. According to this preferable configuration, it is possible to provide the capacity control valve which is downsized with the small number of parts.

It may be preferable that the valve element is a pillar-shaped body having a constant cross section. According to this preferable configuration, turbulence less easily occurs in a flow of the fluid at the time of opening the CS valve, and it is possible to stably operate the valve element.

It may be preferable that the valve element also serves as a rod arranged to pass through a coil of the solenoid. According to this preferable configuration, the capacity control valve obtains a simple structure, and the stroke precision of the valve element is high.

It may be preferable that the direction in which the valve element is biased by the spring is a valve opening direction of the CS valve. According to this preferable configuration, by moving the valve element in the valve opening direction at the time of non-energization, the control pressure and the suction pressure more easily match with each other, and it is possible to instantaneously restore to normal control from the maximum energized state.

It may be preferable that the control fluid may be introduced into a back surface side of the valve element. According to this preferable configuration, the control fluid is also introduced into the back surface side of the valve element which is opposite to the side abutted with the CS valve seat. Thus, by applying the control pressure to the valve element from both the ends, it is possible to reduce an influence of the control pressure applied to the valve element.

It may be preferable that the control fluid from the control port is introduced into a first end side of the valve element opposed to the back surface side, and the control fluid from the control port is introduced, via a supply passage formed in the valve housing, into a second end side of the valve element as the back surface side. According to the eighth aspect, it is possible to apply the control pressure to the valve element from both the ends by a simple configuration.

It may be preferable that the control fluid from the control port is introduced into a first end side of the valve element opposed to the back surface side, and the control fluid from the control port is introduced, via a supply passage formed in the valve element, into a second end side of the valve element as the back surface side. According to this preferable configuration, it is possible to apply the control pressure to the valve element from both the ends by a simple configuration.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 2. Hereinafter, description will be given with the left and right sides seen from the front side of FIG. 1 being the left and right sides of the capacity control valve.

A capacity control valve V according to the first embodiment of the present invention is assembled into a variable displacement compressor (not shown) used for an air conditioning system of an automobile, etc. By variably controlling pressure of a working fluid (hereinafter, simply referred to as the "fluid") serving as a coolant, a discharge amount of the variable displacement compressor is controlled and the air conditioning system is adjusted to have a desired cooling ability.

First, the variable displacement compressor will be described. The variable displacement compressor has a casing including a discharge chamber, a suction chamber, a control chamber, and plural cylinders. A communication passage providing direct communication between the discharge chamber and the control chamber is provided in the variable displacement compressor. A fixed orifice 9 for adjusting to balance pressure between the discharge chamber and the control chamber is provided in this communication passage (see FIGS. 1 and 2).

The variable displacement compressor also includes a rotating shaft to be driven and rotated by an engine (not shown) installed outside the casing, a swash plate coupled to the rotating shaft in an eccentric state by a hinge mechanism in the control chamber, and plural pistons coupled to the swash plate and fitted reciprocatably in the respective cylinders. With using the capacity control valve V to be driven to open and close by electromagnetic force, a tilt angle of the swash plate is continuously changed by appropriately controlling pressure in the control chamber while utilizing suction pressure Ps of the suction chamber that suctions the fluid, discharge pressure Pd of the discharge chamber that discharges the fluid pressurized by the pistons, and control pressure Pc of the control chamber that houses the swash plate. Thereby, a stroke amount of the pistons is changed to control a discharge amount of the fluid.

Figure 1:
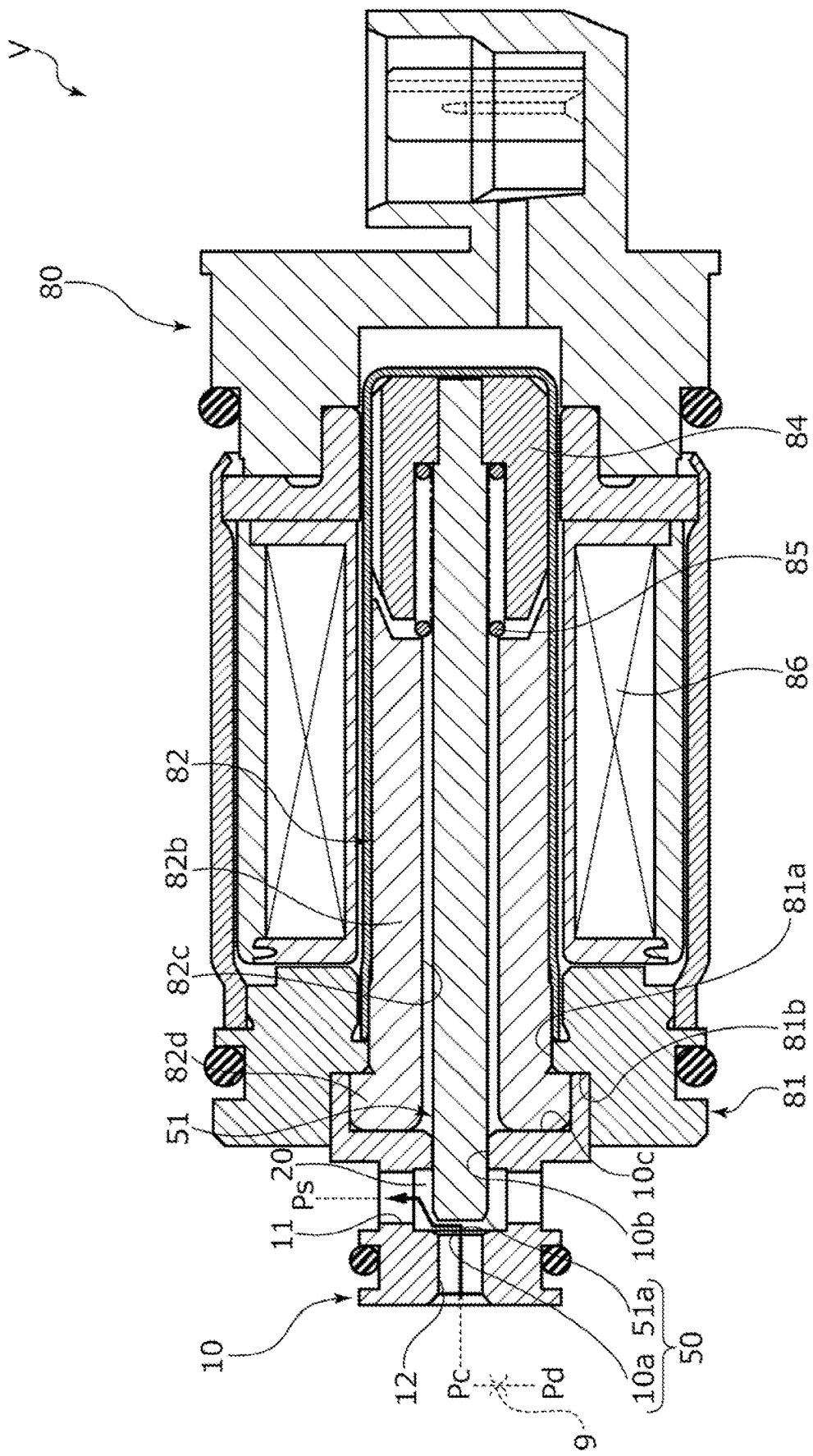
FIG. 1 is a sectional view showing a state where a CS valve is opened in a non-energized state of a capacity control valve according to a first embodiment of the present invention.
Figure 2:
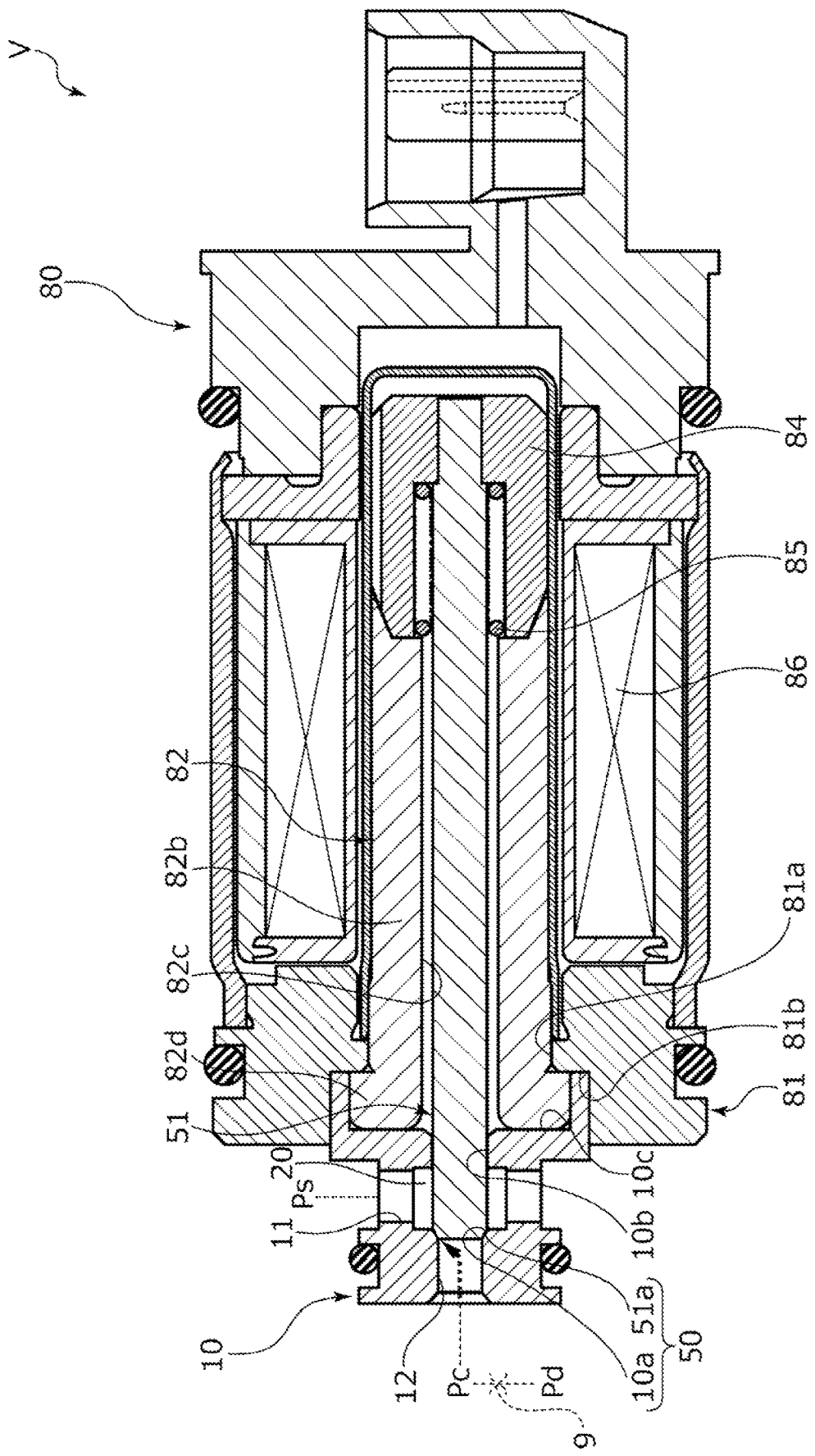
FIG. 2 is a sectional view showing a state where the CS valve is closed in an energized state (e.g., at the time of normal control) of the capacity control valve in the first embodiment.

As shown in FIGS. 1 and 2, the capacity control valve V assembled into the variable displacement compressor adjusts an electric current energized in a coil 86 forming a solenoid 80 and performs open/close control of a CS valve 50 in the capacity control valve V, so that by controlling the fluid flowing out to the suction chamber from the control chamber, the control pressure Pc in the control chamber is variably controlled. A discharge fluid of the discharge pressure Pd of the discharge chamber is always supplied to the control chamber via the fixed orifice 9, and the control pressure Pc in the control chamber can be increased by closing the CS valve 50 in the capacity control valve V.

In the present embodiment, the CS valve 50 is formed by a CS valve element 51 serving as a valve element and a CS valve seat 10*a* formed on an inner peripheral surface of a valve housing 10. By bringing and separating an axially left end 51*a* of the CS valve element 51 into contact with and from the CS valve seat 10*a*, the CS valve 50 is opened and closed.

Next, a structure of the capacity control valve V will be described. As shown in FIGS. 1 and 2, the capacity control valve V is mainly formed by the valve housing 10 made of a metal material or a resin material, the CS valve element 51 whose axially left end portion is arranged in the valve housing 10, and the solenoid 80 connected to the valve housing 10, the solenoid that applies drive force to the CS valve element 51.

As shown in FIGS. 1 and 2, the CS valve element 51 is a pillar-shaped body having a constant section, and also serves as a rod arranged to pass through the coil 86 of the solenoid 80.

As shown in FIGS. 1 and 2, in the valve housing 10, a Ps port 11 serving as a suction port which communicates with the suction chamber of the variable displacement compressor, and a Pc port 12 serving as a control port which communicates with the control chamber of the variable displacement compressor are formed.

Inside the valve housing 10, a valve chamber 20 is formed. In the valve chamber 20, the axially left end portion of the CS valve element 51 is arranged reciprocatably in the axial direction. The Ps port 11 extends in the radially inward direction from an outer peripheral surface of the valve housing 10, and communicates with the valve chamber 20. The Pc port 12 extends to the axially right side from the radially inner side of an axially left end of the valve housing 10, and communicates with the valve chamber 20.

On the inner peripheral surface of the valve housing 10, the CS valve seat 10*a* is formed at an opening end edge of the Pc port 12 on the valve chamber 20 side. On the inner peripheral surface of the valve housing 10, a guide hole 10*b* with which an outer peripheral surface of the CS valve element 51 is slidable in a substantially sealed state is formed on the solenoid 80 side of the CS valve seat 10*a* and the valve chamber 20. That is, in the valve housing 10, the CS valve seat 10*a* and the guide hole 10*b* are integrally formed on the inner peripheral surface. Between an inner peripheral surface of the guide hole 10*b* and the outer peripheral surface of the CS valve element 51, a minute gap is formed by slightly separating in the radial direction. The CS valve element 51 is smoothly movable with respect to the valve housing 10 in the axial direction.

In the valve housing 10, a recessed portion 10*c* in which the radially inner side of an axially right end is recessed to the axially left side is formed, and integrally connected and fixed in a substantially sealed state by inserting a flange portion 82*d* of a center post 82 from the axially right side. On the radially inner side of a bottom surface of the recessed portion 10*c* of the valve housing 10, an opening end of the guide hole 10*b* on the solenoid 80 side is formed.

As shown in FIGS. 1 and 2, the solenoid 80 is mainly formed by a casing 81 having an opening portion 81*a* which is open on the axially left side, a substantially cylindrical center post 82 inserted into the opening portion 81*a* of the casing 81 from the axially left side and fixed on the radially inner side of the casing 81, the CS valve element 51 inserted into the center post 82 reciprocatably in the axial direction, the CS valve element whose axially left end portion is arranged in the valve housing 10, a movable iron core 84 to which an axially right end portion of the CS valve element 51 is inserted and fixed, a coil spring 85 provided between the center post 82 and the movable iron core 84, the coil spring serving as a spring that biases the movable iron core 84 to the axially right side which is the valve opening direction of the CS valve 50, and the excitation coil 86 wound on the outside of the center post 82 via a bobbin.

A recessed portion 81*b* in which the radially inner side of an axially left end is recessed to the axially right side is formed in the casing 81. An axially right end portion of the valve housing 10 is inserted and fixed to this recessed portion 81*b* in a substantially sealed manner.

The center post 82 is made of a rigid body which is a magnetic material such as iron or silicon steel, and includes a cylindrical portion 82*b* extending in the axial direction, the cylindrical portion where an insertion hole 82*c* into which the CS valve element 51 is inserted is formed, and the annular flange portion 82*d* extending in the radially outward direction from an outer peripheral surface of an axially left end portion of the cylindrical portion 82*b*.

The center post 82 is inserted and fixed to the recessed portion 10*c* of the valve housing 10 inserted and fixed to the recessed portion 81*b* of the casing 81 in a substantially sealed manner in a state where an axially right end surface of the flange portion 82*d* is abutted with a bottom surface of the recessed portion 81*b* of the casing 81 from the axially left side. That is, the center post 82 is fixed by sandwiching the flange portion 82*d* between the bottom surface of the recessed portion 81*b* of the casing 81 and the bottom surface of the recessed portion 10*c* of the valve housing 10 from both the sides in the axial direction. By connecting the solenoid 80 to the valve housing 10, it is possible to arrange the insertion hole 82*c* of the center post 82 into which the CS valve element 51 is inserted and the guide hole 10b of the valve housing 10 continuously in the axial direction.

Next, actions of the capacity control valve V, mainly actions of opening and closing the CS valve 50 will be described.

First, a non-energized state of the capacity control valve V will be described. As shown in FIG. 1, in the capacity control valve V, in a non-energized state, by pressing the movable iron core 84 to the axially right side by bias force of the coil spring 85, the CS valve element 51 is moved to the axially right side, the axially left end 51a of the CS valve element 51 is separated from the CS valve seat 10a, and the CS valve 50 is opened.

At this time, to the CS valve element 51, the bias force ($F_{sp}$) of the coil spring 85 and force ($F_{P1}$) by pressure of the fluid to an axially left end surface of the CS valve element 51 are applied to the axially right side, and force ($F_{P2}$) by pressure of the fluid to an axially right end surface of the CS valve element 51 is applied to the axially left side. That is, given that the right side is the positive side, force $F_{rod}=F_{sp}+F_{P1}-F_{P2}$ is applied to the CS valve element 51. At the time of opening the CS valve 50, the force ($F_{P1}$) by the pressure of the fluid to the axially left end surface of the CS valve element 51 is force by pressure of the fluid in the valve chamber 20, and the force ($F_{P2}$) by the pressure of the fluid to the axially right end surface of the CS valve element 51 is force by pressure of the fluid running round from the valve chamber 20 to the back surface side of the CS valve element 51 via the gap between the inner peripheral surface of the guide hole 10b of the valve housing 10 and the outer peripheral surface of the valve element 51. The pressure in the valve chamber 20 is based on the control pressure Pc and the suction pressure Ps which are lower than the discharge pressure Pd. Thus, an influence of the force ($F_{P1}$, $F_{P2}$) by the pressure to the CS valve element 51 is small.

Next, an energized state of the capacity control valve V will be described. As shown in FIG. 2, in the capacity control valve V, in an energized state, that is, at the time of normal control, at the time of so-called duty control, when electromagnetic force ($F_{sol}$) generated by applying an electric current to the solenoid 80 exceeds the force $F_{rod}$ ($F_{sol}>F_{rod}$), by pulling the movable iron core 84 to the center post 82 side, that is, to the axially left side, and moving the CS valve element 51 fixed to the movable iron core 84 to the axially left side together, the axially left end 51a of the CS valve element 51 is seated on the CS valve seat 10a of the valve housing 10, and the CS valve 50 is closed.

At this time, to the CS valve element 51, the electromagnetic force ($F_{sol}$) is applied on the axially left side, and the force $F_{rod}$ is applied on the axially right side. That is, given that the right side is the positive side, force $F_{rod}$-$F_{sol}$ is applied to the CS valve element 51. At the time of closing the CS valve 50, the force ($F_{P1}$) by the pressure of the fluid to the axially left end surface of the CS valve element 51 is the control pressure Pc of the control fluid of the Pc port 12.

According to this, in the capacity control valve V, Pc-Ps control that opens and closes the CS valve 50 to supply the control fluid of the control pressure Pc supplied from the Pc port 12 to the suction chamber via the Ps port 11 and lower the control pressure Pc of the control chamber is performed. In other words, the discharge fluid of the discharge pressure Pd which is high pressure is not directly controlled. Thus, by a valve opening degree of the CS valve 50 adjusted by balance between the electromagnetic force of the solenoid 80 and the bias force of the coil spring 85, it is possible to finely change the control pressure Pc. In addition, there is no need for adjusting the valve opening degree of the CS valve 50 by a pressure sensitive body unlike a conventional example. Thus, it is possible to provide the capacity control valve V which is downsized with the small number of parts.

By adjusting balance between an amount of supplying the discharge fluid of the discharge pressure Pd to the control chamber via the fixed orifice 9 provided in the variable displacement compressor and an amount of supplying the control fluid of the control pressure Pc to the suction chamber by a change in the valve opening degree of the CS valve 50, it is possible to respond to various needs of the variable displacement compressor. For example, it is possible to perform control in such a manner that the control pressure Pc is not changed when a value of the electric current applied to the solenoid 80 is within a predetermined range, and the control pressure Pc is increased when the value becomes a predetermined value or more.

In the valve housing 10, the guide hole 10b into which the CS valve element 51 is inserted is formed. Thus, by guiding the CS valve element 51 into the guide hole 10b, it is possible to enhance precision of an action of the CS valve element 51. Further, in the valve housing 10, the CS valve seat 10a and the guide hole 10b are integrally formed. Thus, it is possible to provide the capacity control valve V which is downsized with the small number of parts.

The CS valve element 51 is a pillar-shaped body having a constant section. Thus, turbulence less easily occurs in a flow of the fluid in the valve chamber 20 at the time of opening the CS valve 50, and it is possible to stably operate the CS valve element 51. Further, the CS valve element 51 also serves as a rod arranged to pass through the coil 86 of the solenoid 80. Thus, the capacity control valve V obtains a simple structure, and stroke precision of the CS valve element 51 is high.

The capacity control valve V is formed as a normal open type in which the CS valve element 51 is biased in the valve opening direction of the CS valve 50 by the coil spring 85. Thus, it is possible to reliably move the CS valve element 51 to a valve opening position by a decrease in the value of the electric current applied to the solenoid 80, and to instantaneously restore from the maximum energized state of the maximum duty to a less-energized state, that is, to duty control. By moving the CS valve element 51 in the valve opening direction in a non-energized state of the capacity control valve V, it is possible to make the control pressure Pc and the suction pressure Ps more easily match with each other.

Second Embodiment

Next, a capacity control valve according to a second embodiment of the present invention will be described with reference to FIGS. 3 and 4. Duplicated description for the same configurations as the first embodiment is omitted.

In the present embodiment, a CS valve 150 is formed by a CS valve element 151 serving as a valve element, and a CS valve seat 110a formed on an inner peripheral surface of a valve housing 110. By bringing and separating an axially right side surface of a large diameter portion 151a of the CS valve element 151 into contact with and from the CS valve seat 110a, the CS valve 150 is opened and closed.

Figure 3:
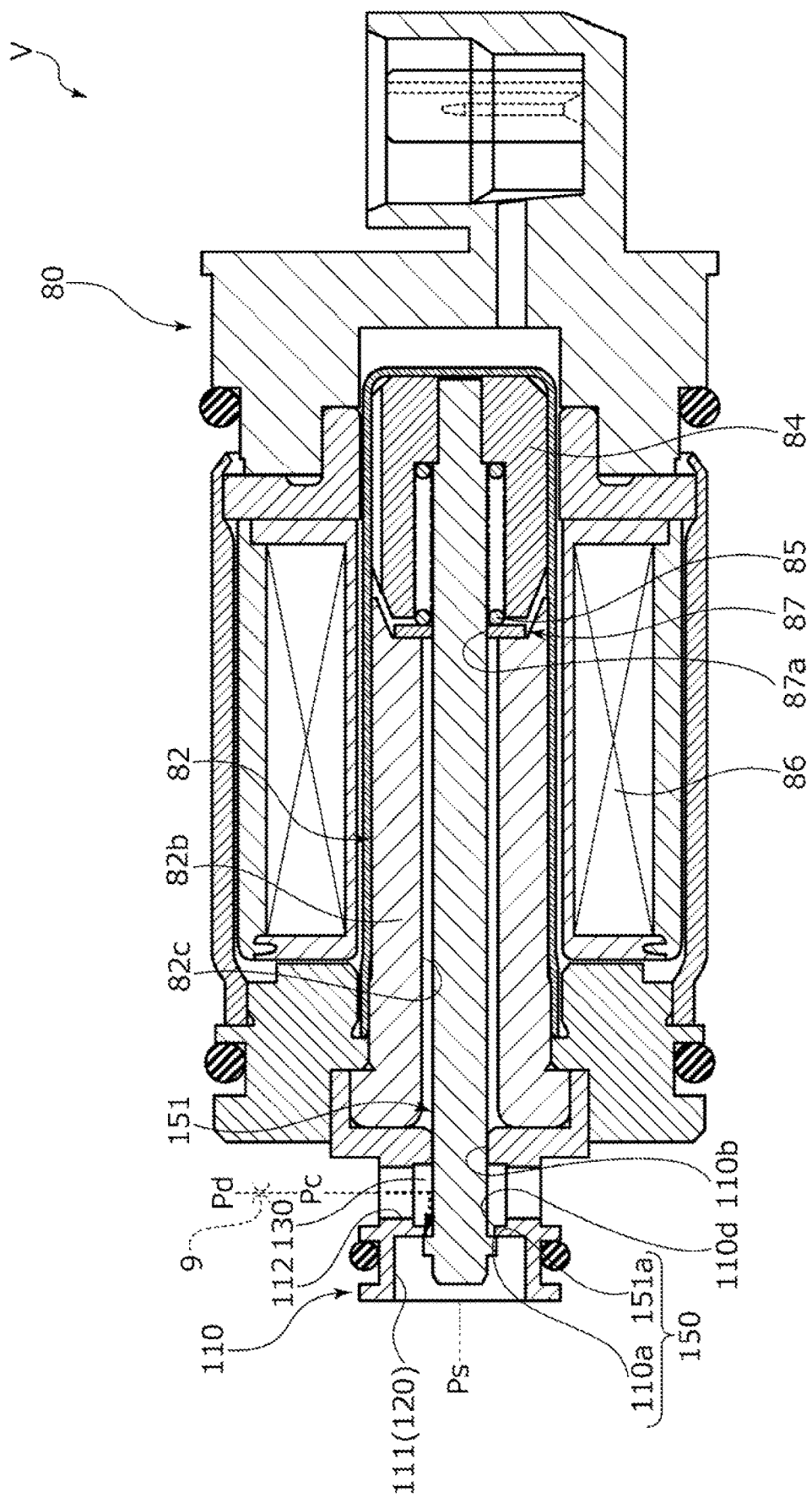
FIG. 3 is a sectional view showing a state where a CS valve is closed in a non-energized state of a capacity control valve according to a second embodiment of the present invention.
Figure 4:
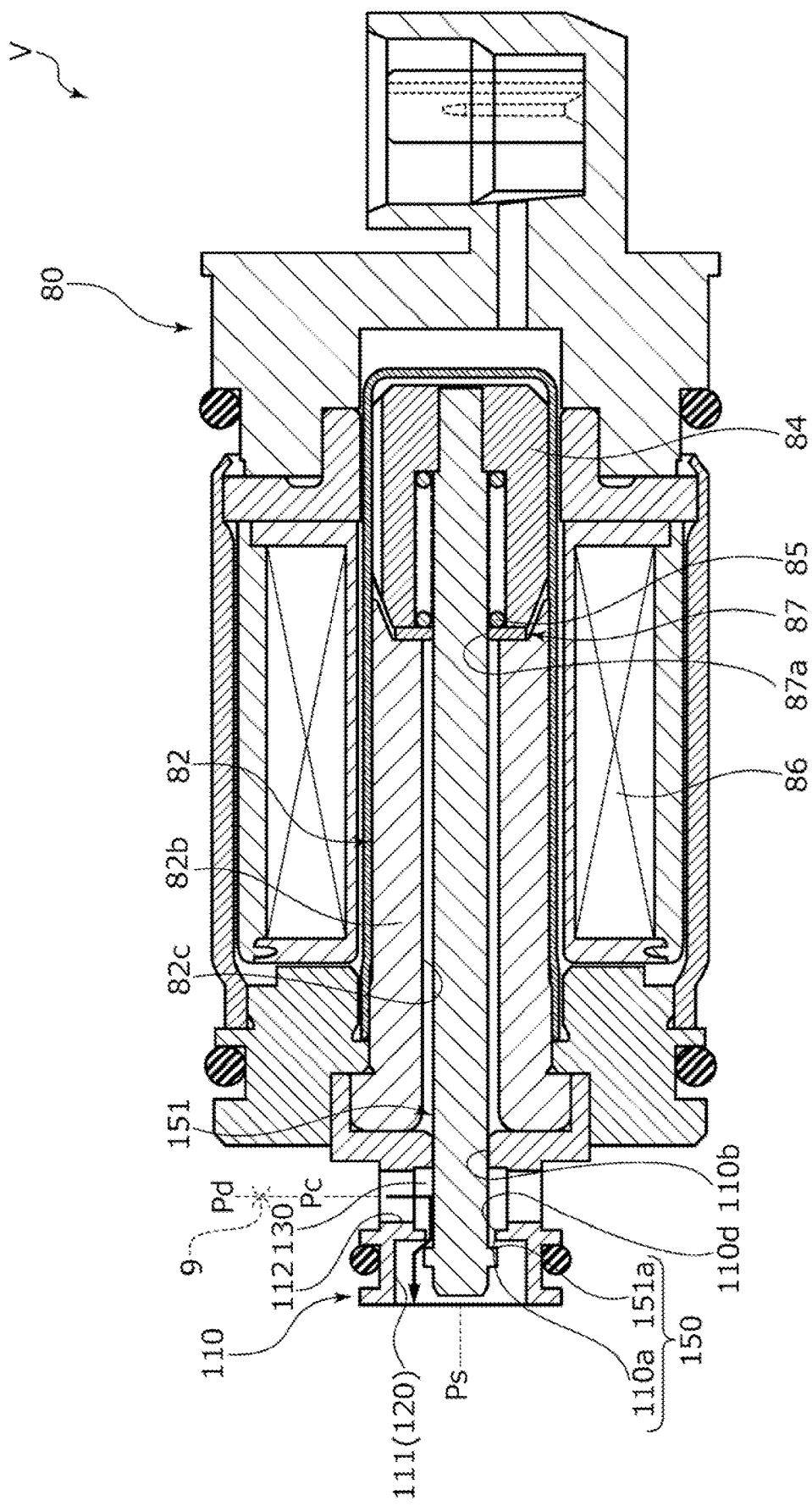
FIG. 4 is a sectional view showing a state where the CS valve is opened in an energized state (e.g., at the time of normal control) of the capacity control valve in the second embodiment.

As shown in FIGS. 3 and 4, the CS valve element 151 is a pillar-shaped body in which the large diameter portion 151a is formed in an axially left end portion, and also serves as a rod arranged to pass through a coil 86 of a solenoid 80.

In the valve housing 110, a Ps port 111 serving as a suction port which communicates with a suction chamber of a variable displacement compressor, and a Pc port 112 serving as a control port which communicates with a control chamber of the variable displacement compressor are formed. The Ps port 111 is formed by a recessed portion in which the radially inner side of an axially left end of the valve housing 110 is recessed to the axially right side, and also serves as a valve chamber 120 in which the large diameter portion 151a of the CS valve element 151 is arranged reciprocatably in the axial direction.

The Pc port 112 extends in the radially inward direction from an outer peripheral surface of the valve housing 110 and communicates with a control fluid supply chamber 130. The control fluid supply chamber 130 communicates with the valve chamber 120 via a valve hole 110d formed on the inner peripheral surface of the valve housing 110.

On the inner peripheral surface of the valve housing 110, the CS valve seat 110a is formed at an opening end edge of the valve hole 110d on the valve chamber 120 side.

Next, actions of a capacity control valve V, mainly actions of opening and closing the CS valve 150 will be described.

First, a non-energized state of the capacity control valve V will be described. As shown in FIG. 3, in the capacity control valve V, in a non-energized state, by pressing a movable iron core 84 to the axially right side by bias force of a coil spring 85, the CS valve element 151 is moved to the axially right side, the axially right side surface of the large diameter portion 151a of the CS valve element 151 is seated on the CS valve seat 110a, and the CS valve 150 is closed.

At this time, to the CS valve element 151, the bias force ($F_{sp}$) of the coil spring 85 and force Fri by pressure of a fluid to an axially left side surface of the large diameter portion 151a of the CS valve element 151 are applied to the axially right side, and force $F_{P2}$ by pressure of the fluid to the axially right side surface of the large diameter portion 151a of the CS valve element 151 is applied to the axially left side. That is, given that the right side is the positive side, force $F_{rod}=F_{sp}+F_{P1}-F_{P2}$ is applied to the CS valve element 151. A seal member 87 is provided in an axially right end of a cylindrical portion 82b of a center post 82, and a guide hole 87a with which an outer peripheral surface of the CS valve element 151 is slidable in a substantially sealed state is formed on the radially inner side of the seal member 87. That is, the seal member 87 makes sealing in such a manner that the fluid does not run round from the control fluid supply chamber 130 to the back surface side of the CS valve element 151 through the guide hole 110b of the valve housing 110 and an insertion hole 82c of the center post 82.

Next, an energized state of the capacity control valve V will be described. As shown in FIG. 4, in the capacity control valve V, in an energized state, that is, at the time of normal control, at the time of so-called duty control, when electromagnetic force $F_{sol}$ generated by applying an electric current to the solenoid 80 exceeds the force $F_{rod}$ (i.e., $F_{sol}>F_{rod}$), by pulling the movable iron core 84 to the center post 82 side, that is, to the axially left side, and moving the CS valve element 151 fixed to the movable iron core 84 to the axially left side together, the axially right side surface of the large diameter portion 151a of the CS valve element 151 is separated from the CS valve seat 110a of the valve housing 110, and the CS valve 150 is opened.

According to this, the capacity control valve V is formed as a normal close type in which the CS valve element 151 is biased in the valve closing direction of the CS valve 150 by the coil spring 85. Thus, it is possible to reliably move the CS valve element 151 to a valve closing position by a decrease in a value of the electric current applied to the solenoid 80, and to respond to various needs of the variable displacement compressor.

Third Embodiment

Next, a capacity control valve according to a third embodiment of the present invention will be described with reference to FIGS. 5 to 6. Duplicated description for the same configurations as the first embodiment is omitted.

Figure 5:
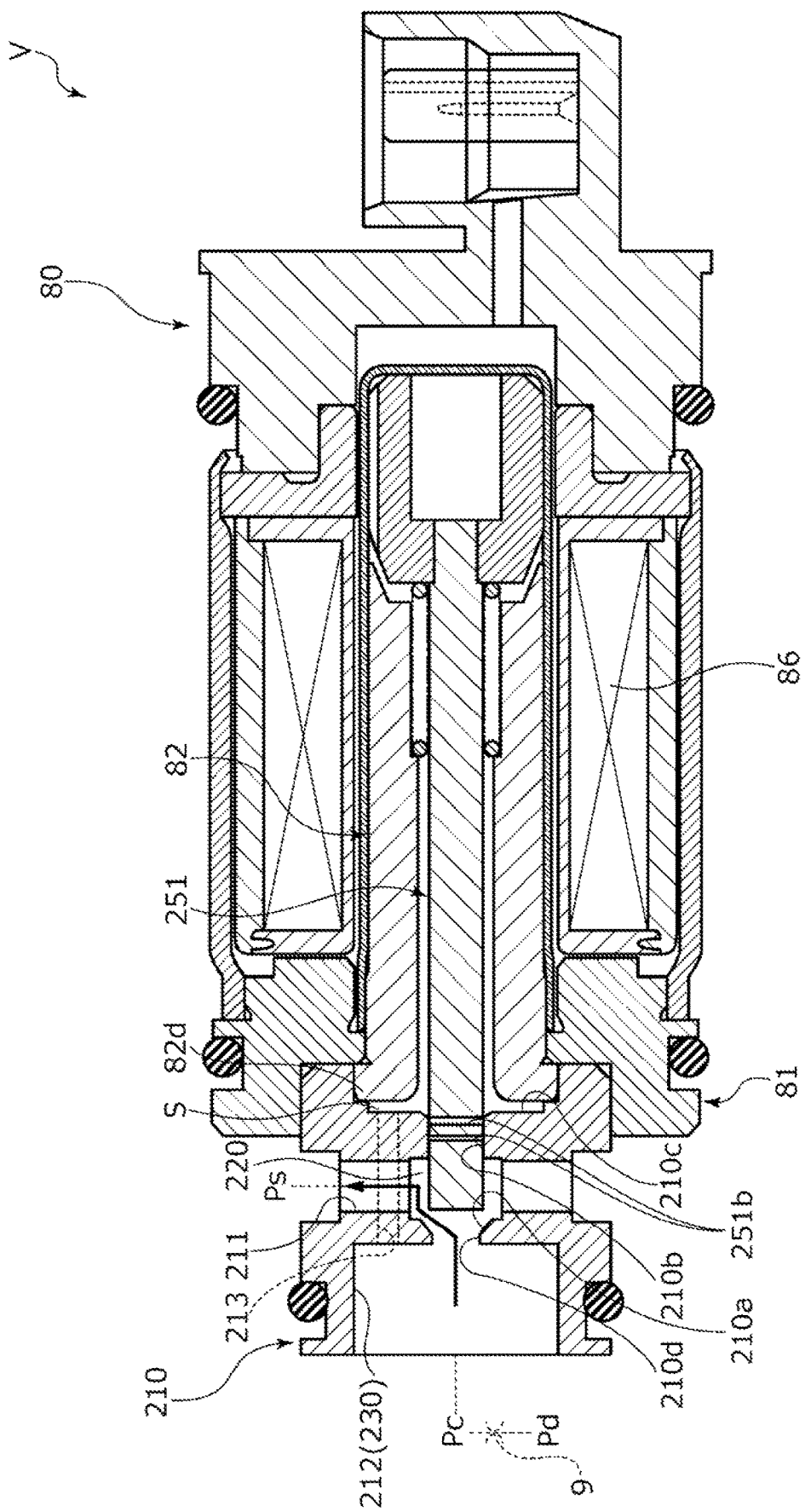
FIG. 5 is a sectional view showing a state where a CS valve is opened in a non-energized state of a capacity control valve according to a third embodiment of the present invention.
Figure 6:
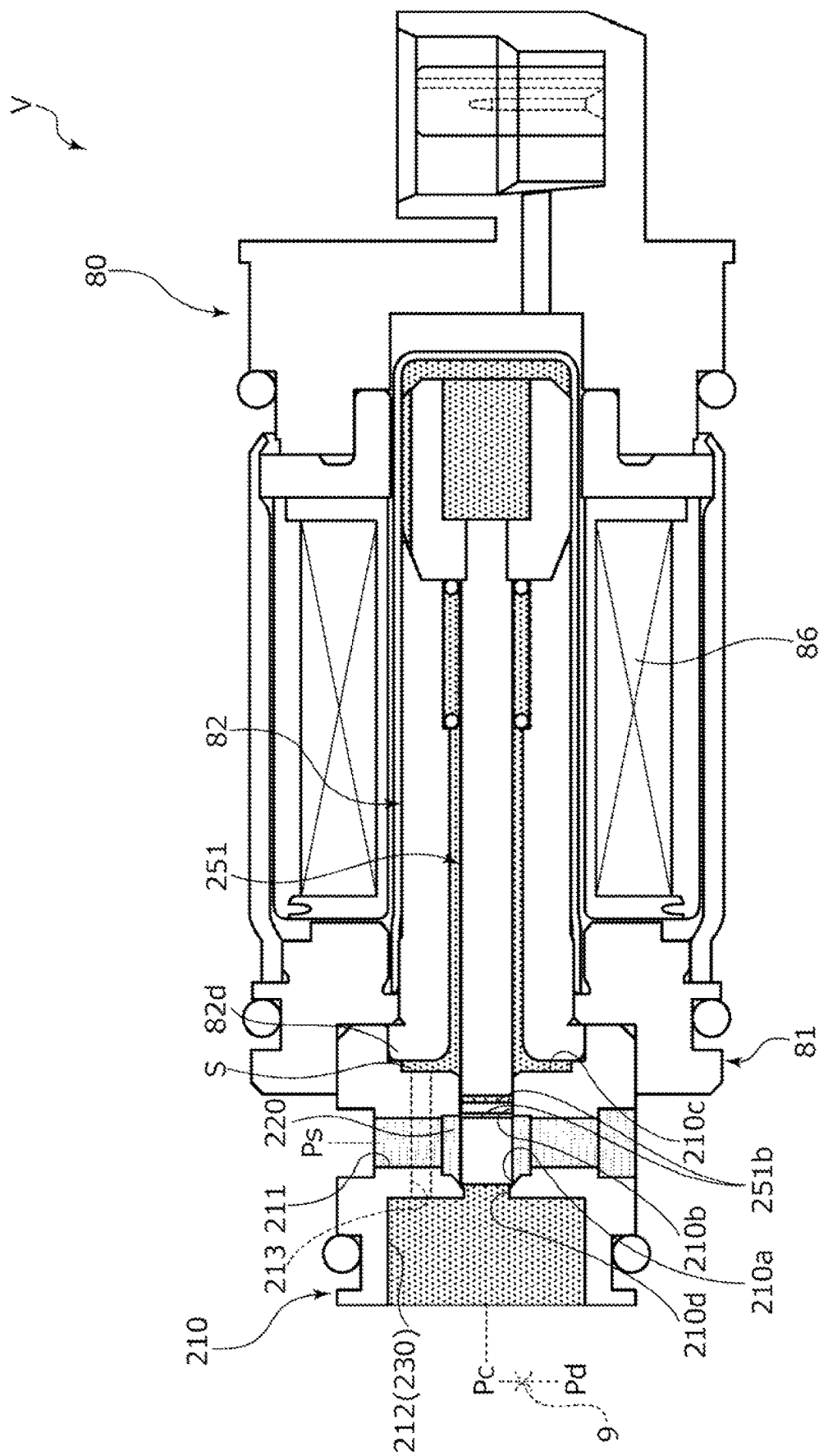
FIG. 6 is a sectional view showing pressure distribution when the CS valve is closed in an energized state (e.g., at the time of normal control) of the capacity control valve in the third embodiment. In order to show the pressure distribution, sections of members are not shown in the figure.

As shown in FIGS. 5 and 6, a CS valve element 251 is a pillar-shaped body in which an annular groove 251b is formed on an outer peripheral surface to slide with an inner peripheral surface of a guide hole 210b of a valve housing 210, and also serves as a rod arranged to pass through a coil 86 of a solenoid 80.

In the valve housing 210, a Ps port 211 serving as a suction port which communicates with a suction chamber of a variable displacement compressor, and a Pc port 212 serving as a control port which communicates with a control chamber of the variable displacement compressor are formed. The Pc port 212 is formed by a recessed portion in which the radially inner side of an axially left end of the valve housing 210 is recessed to the axially right side, and also serves as a control fluid supply chamber 230 to which a control fluid of control pressure Pc is supplied.

The Ps port 211 extends in the radially inward direction from an outer peripheral surface of the valve housing 210 and communicates with a valve chamber 220 in which an axially left end portion of the CS valve element 251 is arranged reciprocatably in the axial direction. The valve chamber 220 communicates with the control fluid supply chamber 230 via a through hole 210d formed on an inner peripheral surface of the valve housing 210.

On the inner peripheral surface of the valve housing 210, a CS valve seat 210a is formed at an opening end edge of the through hole 210d on the valve chamber 220 side.

A supply passage 213 passing through in the axial direction is formed in the valve housing 210. By attaching a center post 82 and the valve housing 210 to a casing 81, communication is always provided between a space S formed by an axially left end surface of a flange portion 82d of the center post 82 and an inner peripheral surface of a recessed portion 210c of the valve housing 210, and the control fluid supply chamber 230.

According to this, in the CS valve element 251, by introducing the control pressure Pc supplied from the Pc port 212 to the control fluid supply chamber 230 into the axially left end side which is the one end side, and also introducing the control pressure Pc supplied to the space S via the supply passage 213 into the axially right end side which is the other end side, it is possible to apply the control pressure Pc to the CS valve element 251 from both the ends in the axial direction. Thus, it is possible to reduce an influence of the control pressure Pc applied to the CS valve element 251 with a simple structure.

By a labyrinth effect of the annular groove 251b serving as a seal portion which is formed on the outer peripheral surface of the CS valve element 251, it is possible to suppress leakage of the fluid supplied to the space S via the supply passage 213 to the valve chamber 220 side. Thus, the control pressure Pc applied to the CS valve element 251 from both the ends in the axial direction is more easily maintained to be substantially constant.

Fourth Embodiment

Next, a capacity control valve according to a fourth embodiment of the present invention will be described with reference to FIGS. 7 to 8. Duplicated description for the same configurations as the first embodiment is omitted.

Figure 7:
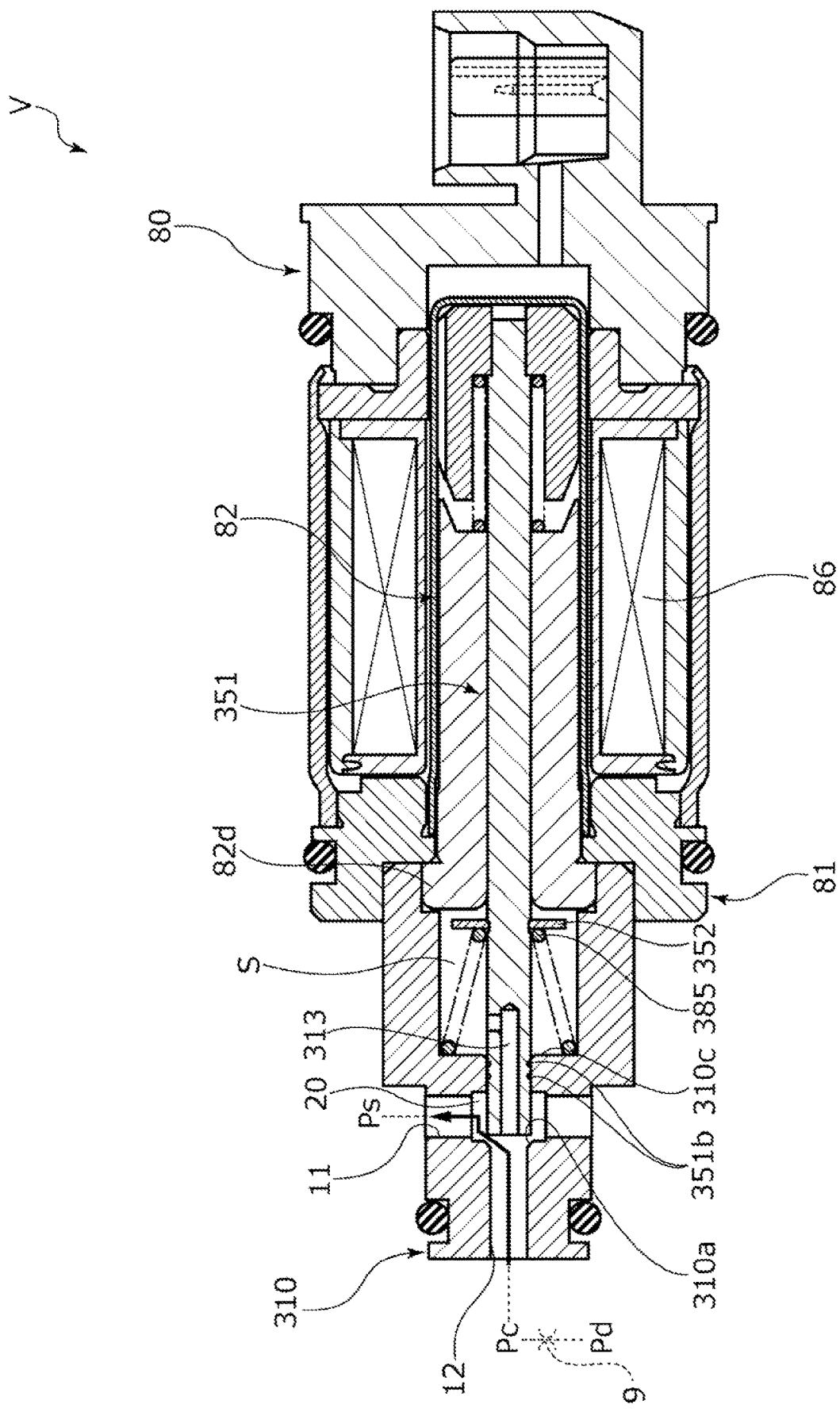
FIG. 7 is a sectional view showing a state where a CS valve is opened in a non-energized state of a capacity control valve according to a fourth embodiment of the present invention.
Figure 8:
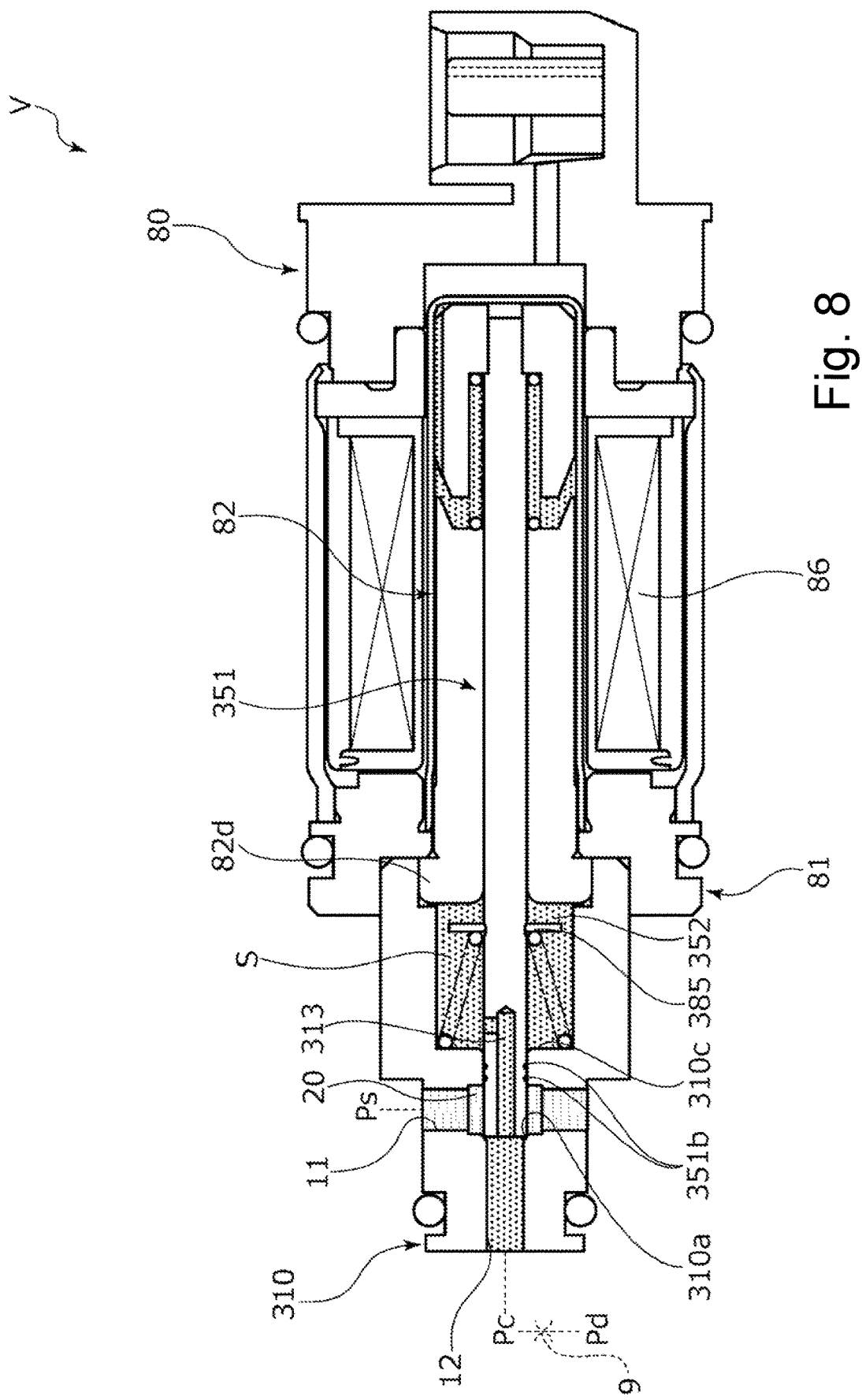
FIG. 8 is a sectional view showing pressure distribution when the CS valve is closed in an energized state (e.g., at the time of normal control) of the capacity control valve in the fourth embodiment. In order to show the pressure distribution, sections of members are not shown in the figure.

As shown in FIGS. 7 and 8, a CS valve element 351 is a pillar-shaped body in which an annular groove 351*b* serving as a seal portion is formed on an outer peripheral surface to slide with an inner peripheral surface of a guide hole 310*b* of a valve housing 310, and also serves as a rod arranged to pass through a coil 86 of a solenoid 80. The CS valve element 351 is biased to the axially right side by a coil spring 385 serving as a spring which is provided between an axially left side surface of a regulation plate 352 attached to an axially left end portion and a bottom surface of a recessed portion 310*c* formed on the radially inner side of an axially right end of the valve housing 310.

A supply passage 313 extending from the radially inner side of an axially left end surface to the axially left side is formed in the CS valve element 351. The supply passage 313 extends in the radially outward direction in an axially right end portion and is open in the recessed portion 310*c*. By attaching a center post 82 and the valve housing 310 to a casing 81, communication is always provided between a space S formed by an axially left end surface of a flange portion 82*d* of the center post 82 and an inner peripheral surface of the recessed portion 310*c* of the valve housing 310, and a valve chamber 20 of the valve housing 310.

On an inner peripheral surface of the valve housing 310, a CS valve seat 310*a* is formed at an opening end edge of a Pc port 12 on the valve chamber 20 side.

According to this, in the CS valve element 351, by introducing control pressure Pc supplied from the Pc port 12 into the axially left end side which is the one end side, and also introducing the control pressure Pc supplied to the space S via the supply passage 313 which is formed in the CS valve element 351 into the axially right end side which is the other end side, it is possible to apply the control pressure Pc to the CS valve element 351 from both the ends in the axial direction. Thus, it is possible to reduce an influence of the control pressure Pc applied to the CS valve element 351 with a simple structure.

By a labyrinth effect of the annular groove 351*b* formed on the outer peripheral surface of the CS valve element 351, it is possible to suppress leakage of a fluid supplied to the space S via the supply passage 313 to the valve chamber 20 side. Thus, the control pressure Pc applied to the CS valve element 351 from both the ends in the axial direction is more easily maintained to be substantially constant.

The embodiments of the present invention are described above with the drawings. However, specific configurations are not limited to these embodiments but the present invention includes changes and additions within the range not departing from the scope of the present invention.

For example, the above embodiments describe that the CS valve element also serves as the rod arranged to pass through the coil 86 of the solenoid 80. However, the present invention is not limited to this but the CS valve element may be formed reciprocatably in the axial direction together with a separate rod.

The above embodiments describe that the CS valve seat and the guide hole are integrally formed on the inner peripheral surface of the valve housing. However, the present invention is not limited to this but a valve housing having a CS valve seat and a valve housing having a guide hole may be separately provided.

A guide portion is not limited to be formed in the valve housing but may be formed in part of the insertion hole 82*c* of the center post 82, for example.

The third and fourth embodiments describe the mode in which the control pressure Pc is supplied to the space S via the supply passage 213 formed in the valve housing 210 or the supply passage 313 formed in the CS valve element 351. However, the present invention is not limited to this but, as long as the control pressure Pc can be supplied to the space S, for example, a Pc communication passage providing direct communication between the space S and the control chamber of the variable displacement compressor may be provided in the valve housing.

A communication passage and a fixed orifice providing direct communication between the control chamber and the suction chamber of the variable displacement compressor may be provided.

REFERENCE SIGNS LIST

9 Fixed orifice
10 Valve housing
10*a* CS valve seat
10*b* Guide hole
11 Ps port (suction port)
12 Pc port (control port)
20 Valve chamber
50 CS valve
51 CS valve element (valve element)
51*a* Axially left end
80 Solenoid
82 Center post
84 Movable iron core
85 Coil spring (spring)
87 Seal member
110 Valve housing
110*a* CS valve seat
110*b* Guide hole
110*d* Valve hole
111 Ps port (suction port)
112 Pc port (control port)
120 Valve chamber
130 Control fluid supply chamber
150 CS valve
151 CS valve element (valve element)
151*a* Large diameter portion
210 Valve housing
210*a* CS valve seat
210*b* Guide hole
210*d* Through hole
211 Ps port (suction port)
212 Pc port (control port)
213 Supply passage
220 Valve chamber
230 Control fluid supply chamber
251 CS valve element (valve element)
310 Valve housing
310*a* CS valve seat
310*b* Guide hole
313 Supply passage
351 CS valve element (valve element)
352 Regulation plate
385 Coil spring (spring)
Pc Control pressure
Pd Discharge pressure
Ps Suction pressure
S Space
V Capacity control valve

The invention claimed is:

1. A capacity control valve comprising:
a valve housing provided with a suction port through which a suction fluid of suction pressure passes, and a control port through which a control fluid of control pressure passes;
a valve element configured to be driven by a solenoid;
a spring that biases the valve element against a driving force of the solenoid; and
a CS valve formed by a CS valve seat and the valve element and configured to open and close a communication between the control port and the suction port in accordance with a movement of the valve element, wherein
the control pressure is controlled by opening and closing the CS valve,
a guide hole with which the valve element is slidable in a substantially sealed state and which guides the valve element, and a valve chamber which is formed between the guide hole and the CS valve seat and in which a part of the valve element is housed are formed in the valve housing,
the valve chamber communicates with the suction port,
an inner peripheral surface of the guide hole and an outer peripheral surface of the valve element are separated from each other to allow the suction fluid which flows into the valve chamber through the suction port to run round therebetween,
the valve element is a rod which is fixed to a movable iron core of the solenoid and which extends in an axial direction toward the CS valve seat, and
the control fluid which is supplied from the control port acts on a tip surface of the rod.

2. The capacity control valve according to claim 1, wherein
the CS valve seat is formed in the valve housing.

3. The capacity control valve according to claim 2, wherein
the CS valve seat and the guide hole are provided in one member which partially or integrally forms the valve housing.

4. The capacity control valve according to claim 1, wherein
the rod is a pillar-shaped body having a constant cross section.

5. The capacity control valve according to claim 1, wherein
the rod is arranged to pass through a coil of the solenoid.

6. The capacity control valve according to claim 1, wherein
the direction in which the valve element is biased by the spring is a valve opening direction of the CS valve.

7. A capacity control valve comprising:
a valve housing provided with a suction port through which a suction fluid of suction pressure passes, and a control port through which a control fluid of control pressure passes;
a valve element configured to be driven by a solenoid;
a spring that biases the valve element against a driving force of the solenoid; and
a CS valve formed by a CS valve seat and the valve element and configured to open and close a communication between the control port and the suction port in accordance with a movement of the valve element, wherein
the control pressure is controlled by opening and closing the CS valve,
a guide hole with which the valve element is slidable in a substantially sealed state and which guides the valve element, and a valve chamber which is formed between the guide hole and the CS valve seat and in which a part of the valve element is housed are formed in the valve housing,
the valve chamber communicates with the control port,
an inner peripheral surface of the guide hole and an outer peripheral surface of the valve element are separated from each other to allow the control fluid which flows into the valve camber through the control port to run round therebetween.

8. The capacity control valve according to claim 7, wherein a seal member is provided in the outer peripheral surface of the valve element and configured to prevent the pressure of the control fluid in the valve chamber from running round to a back surface side of the valve element.

9. The capacity control valve according to claim 7, wherein
the CS valve sea is formed in the valve housing.

10. The capacity control valve according to claim 9, wherein
the CS valve seat and the guide hole are provided in one member which partially or integrally forms the valve housing.

11. The capacity control valve according to claim 7, wherein
the valve element also serves as a rod arranged to pass through a coil of the solenoid.

12. The capacity control valve according to claim 7, wherein
the direction in which the valve element is biased by the spring is a valve closing direction of the CS valve.

* * * * *